(12) United States Patent
Ganiger et al.

(10) Patent No.: US 10,323,541 B2
(45) Date of Patent: *Jun. 18, 2019

(54) BEARING OUTER RACE RETENTION DURING HIGH LOAD EVENTS

(71) Applicant: General Electric Company, Schenectady, NY (US)

(72) Inventors: Ravindra Shankar Ganiger, Bangalore (IN); Shivakumar Basavanna, Mullur (IN); Jacob Patrick Miller, Blue Ash, OH (US); Charles Andrew Corman, Milford, OH (US); Mark Leonard Hopper, West Chester, OH (US)

(73) Assignee: General Electric Company, Schenectady, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/459,125

(22) Filed: Mar. 15, 2017

(65) Prior Publication Data

US 2018/0266275 A1    Sep. 20, 2018

(51) Int. Cl.
| | | |
|---|---|---|
| *F01D 25/16* | (2006.01) | |
| *F16C 35/04* | (2006.01) | |
| *F16C 35/067* | (2006.01) | |
| *F04D 29/52* | (2006.01) | |
| *F04D 29/32* | (2006.01) | |
| *F04D 29/059* | (2006.01) | |
| *F01D 21/04* | (2006.01) | |
| *F01D 21/08* | (2006.01) | |
| *F02C 7/06* | (2006.01) | |

(52) U.S. Cl.
CPC ......... *F01D 25/164* (2013.01); *F01D 21/045* (2013.01); *F01D 21/08* (2013.01);
(Continued)

(58) Field of Classification Search
CPC ...... F01D 25/164; F01D 21/08; F01D 21/045; F02C 7/06; F04D 29/522; F04D 29/056;
(Continued)

(56) References Cited

U.S. PATENT DOCUMENTS

| | | |
|---|---|---|
| 1,626,188 A | 4/1927 | De Ram et al. |
| 3,309,154 A | 3/1967 | Stokely |

(Continued)

FOREIGN PATENT DOCUMENTS

EP    2149681 A2    2/2010

OTHER PUBLICATIONS

U.S. Appl. No. 14/948,917, filed Nov. 23, 2015.
U.S. Appl. No. 15/017,791, filed Feb. 8, 2016.
U.S. Appl. No. 15/017,805, filed Feb. 8, 2016.

*Primary Examiner* — Hai H Huynh
(74) *Attorney, Agent, or Firm* — General Electric Company; William Scott Andes (57) ABSTRACT

A housing for retention of the outer race of a bearing of a gas turbine engine includes an arrangement of spring fingers that yields a lightweight housing capable of withstanding very high radial loads combined with very high torsional windup and axial thrust load. Controlled circumferential gaps on both sides of each spring finger limit the deflection and self-arrest the distortion of the housing. The spring fingers define at least one side edge that extends at an angle relative to the axial direction. An axial gap is created on the aft end by a portion of the spring finger beam structure that opposes an axial face of the housing and limits the axial distortion. A radial gap created between interface hardware of the housing and the inner retention housing also acts to retain the spring finger housing under load in a radial direction.

20 Claims, 7 Drawing Sheets

(52) U.S. Cl.
CPC .............. *F02C 7/06* (2013.01); *F04D 29/059* (2013.01); *F04D 29/321* (2013.01); *F04D 29/522* (2013.01); *F16C 35/042* (2013.01); *F16C 35/067* (2013.01); *F05D 2260/30* (2013.01); *F16C 2360/24* (2013.01); *Y02T 50/671* (2013.01)

(58) Field of Classification Search
CPC .. F04D 29/0563; F04D 29/059; F04D 29/321; F16C 35/067; F16C 35/042; F16C 2360/24; F05D 2260/30
USPC .......................................................... 415/229
See application file for complete search history.

(56) References Cited

U.S. PATENT DOCUMENTS

| | | |
|---|---|---|
| 4,792,242 A | 12/1988 | Colanzi et al. |
| 5,052,828 A | 10/1991 | Ciokajlo et al. |
| 5,791,789 A | 8/1998 | Van Duyn et al. |
| 6,099,165 A | 8/2000 | Tremaine |
| 6,413,046 B1 | 7/2002 | Penn et al. |
| 6,540,483 B2 | 4/2003 | Allmon et al. |
| 7,648,278 B2 | 1/2010 | Stout et al. |
| 7,797,922 B2 | 9/2010 | Eleftheriou et al. |
| 8,182,156 B2 | 5/2012 | Kinnaird et al. |
| 8,282,285 B2 | 10/2012 | Brillon |
| 8,322,038 B1 | 12/2012 | Heidari et al. |
| 8,337,090 B2 | 12/2012 | Herborth et al. |
| 8,376,615 B2 | 2/2013 | Becker et al. |
| 8,727,632 B2 | 5/2014 | Do et al. |
| 8,821,029 B2 | 9/2014 | Antunes et al. |
| 8,834,095 B2 | 9/2014 | Davis |
| 9,500,100 B2 | 11/2016 | Carter et al. |
| 9,869,205 B2 * | 1/2018 | Ganiger ................ F01D 25/162 |
| 2003/0039538 A1 | 2/2003 | Allmon et al. |
| 2006/0204153 A1 | 9/2006 | Alam et al. |
| 2007/0031078 A1 | 2/2007 | Hackett |
| 2011/0286836 A1 | 11/2011 | Davis |
| 2013/0331223 A1 | 12/2013 | McCune et al. |

* cited by examiner

FIG. 10

BEARING OUTER RACE RETENTION DURING HIGH LOAD EVENTS

FIELD

The present subject matter relates generally to a bearing in a gas turbine engine, or more particularly to an apparatus and method for retention of the outer race of the bearing.

BACKGROUND

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft (aka HP spool) and the LP shaft (aka LP spool). The combustion gases are then routed through the exhaust section, e.g., to atmosphere.

During normal engine operation, a ball bearing assembly can be provided to act to retain the axial position of the HP shaft (aka HP spool), and a roller bearing assembly can be provided to act to provide radial damping of the fan/rotor system. A traditional design approach consisting of an axial spring finger housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, such axial spring finger housing contains relatively long axial spring fingers for retention of the ball bearing housing, and the long spring fingers take up space in the engine housing, add weight to the engine, have limited torsional load capability and are complicated for manufacture.

Moreover, in a failure mode that results from either a liberated fan blade, a liberated compressor blade or a liberated turbine blade, very high radial loads combined with very high torsional windup provide significant design challenges to the bearings and to the spring finger housing for the ball bearing. The radial load closes the damper gap and the radial bumper gap and creates a harmonic drive effect that loads the spring fingers in torsion. This torsion load on the bearing and its retention housing structure results in an opposing sinusoidal load distribution that twists the spring fingers enough so that the spring fingers develop cracks, which are very undesirable.

BRIEF DESCRIPTION

Aspects and advantages of the invention will be set forth in part in the following description, or may be obvious from the description, or may be learned through practice of the invention.

In one exemplary embodiment of the present disclosure, a housing structure for retention of the outer race of a ball bearing that acts to retain the axial position of the HP shaft has spring fingers that are flat and short. The retention housing includes a spring finger housing connected to a ball bearing housing that is disposed radially inwardly from the spring finger housing. The spring finger housing includes a plurality of spring fingers that are connected to the ball bearing housing and inter-digitated in the circumferential direction with a plurality of struts. Circumferential gaps on each of the opposite circumferential edges of each of the spring fingers limit the circumferential deflections of the spring fingers and self-arrest the distortion of the spring finger structure. Between the aft end of each spring finger and a portion of the aft end of the spring finger housing, there is defined an axial gap that serves to limit the axial distortion of the retention housing structure. Between the inner diametrical face of each finger and the ball bearing housing, there is defined a radial gap that acts to retain the spring finger housing in a radial direction. Each of the circumferential gaps, axial gaps and radial gaps is controlled according to the anticipated load in consideration of the retention housing structure's size and material composition. For example, each spring finger may define a side edge that is angled relative to the axial direction. In this manner, the spring fingers may slide or deflect along the axial direction when the side edges engage a corresponding opposing edge of the aft end of the spring finger housing, thus allowing more spring fingers to engage the spring finger housing and more evenly distribute axial and torsional loads. The resulting design of the spring finger housing integrates the structural components such that they become capable of withstanding the torsional windup and high radial loads that occur with the sudden increase in load that accompanies a blade failure, whether a fan blade, a compressor blade or a turbine blade. Moreover, due to the unique tapered and short spring finger design, the amount of axial and radial space needed for the spring finger housing is reduced along with a concomitant reduction in the weight of the retention housing structure while affording a very high torsional load capability to the retention housing structure.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a high pressure shaft mechanically coupling the high pressure compressor to the high pressure turbine via a ball bearing and which includes a retention housing for the outer race of the ball bearing. The retention housing includes a spring finger housing with interdigitated struts and fingers as summarily described above and in more detail hereinafter with various alternative embodiments. Moreover, embodiments of the retention housing including a spring finger housing with interdigitated struts and fingers as summarily described above and in more detail hereinafter with various alternative embodiments also can be applied to systems with a low pressure shaft that need to address similar challenges with ball bearing components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant or liquid fuel.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 1:
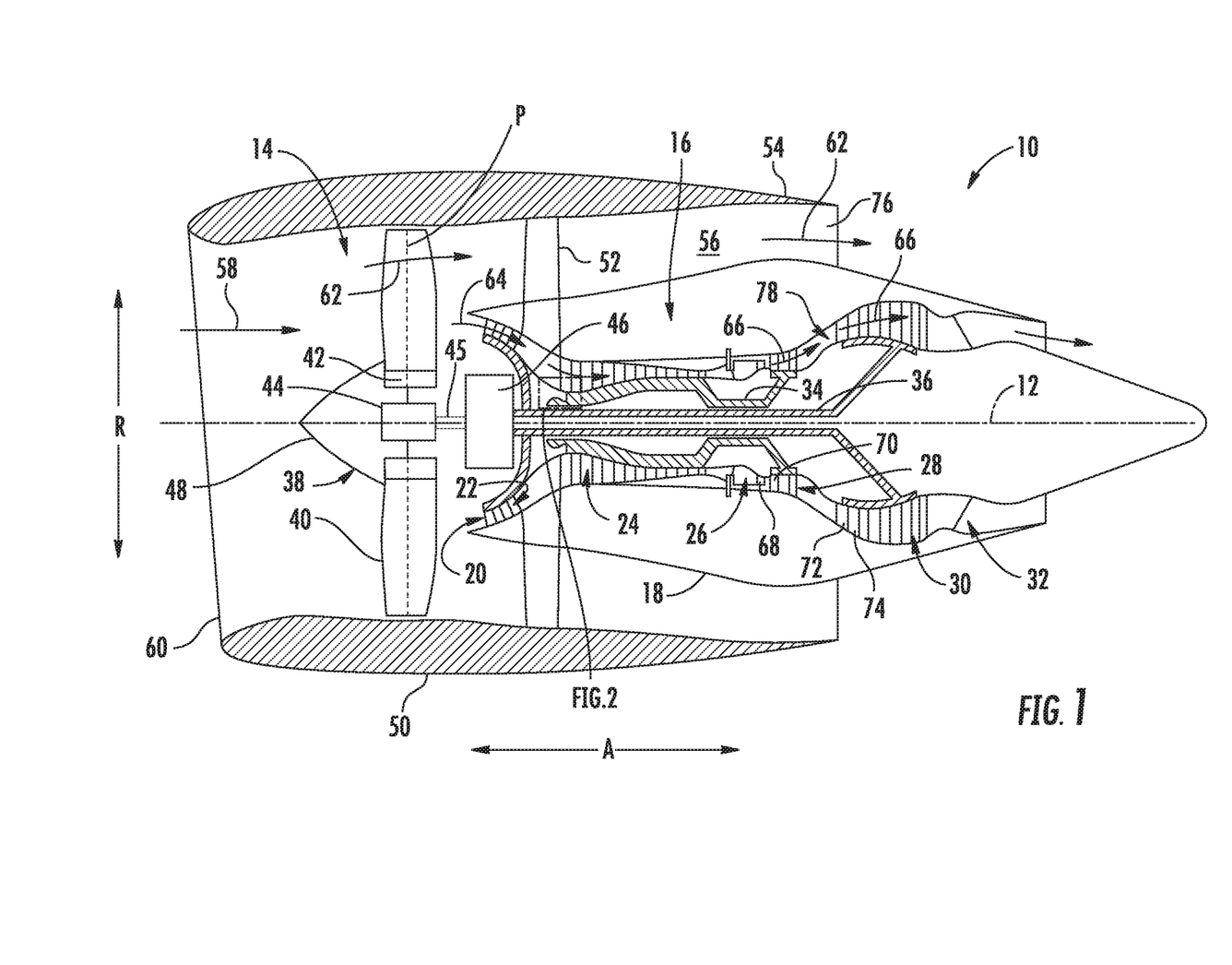
FIG. 1 is a schematic cross-sectional view of an exemplary gas turbine engine according to various embodiments of the present disclosure.
Figure 3:
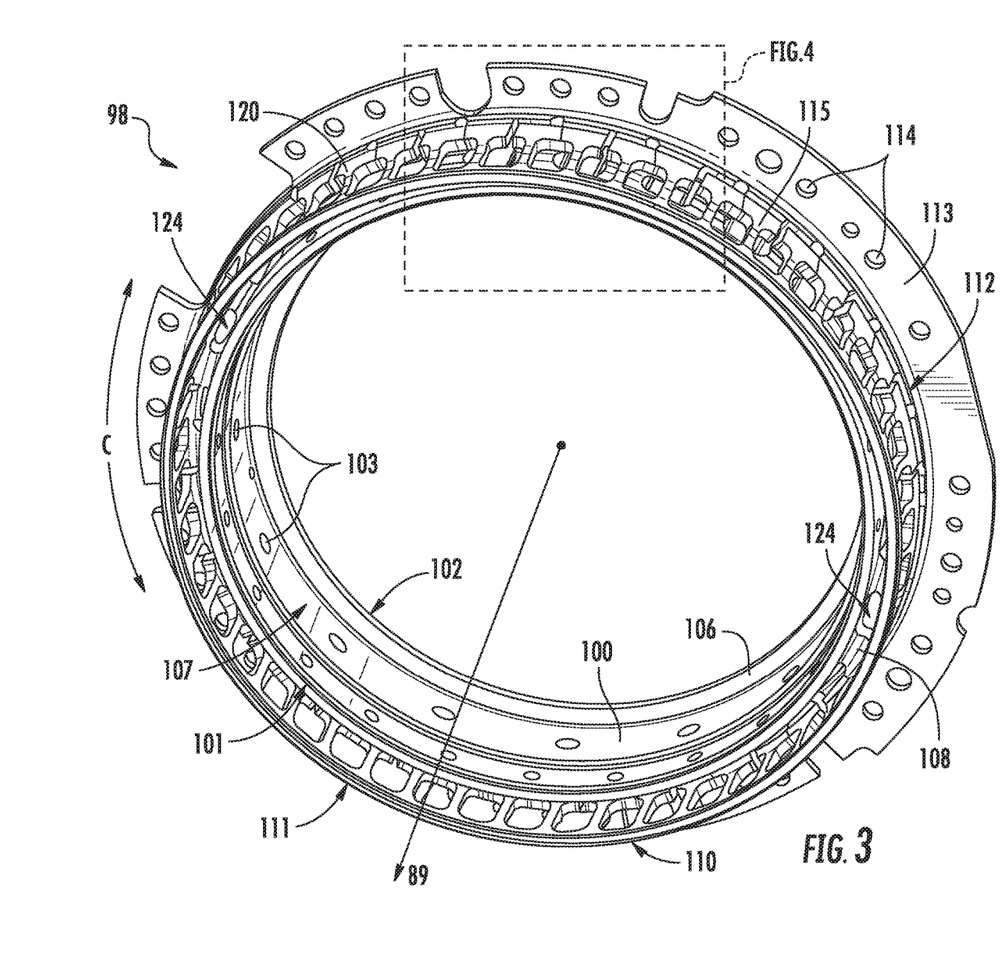
FIG. 3 is a perspective view of a retention housing for use in the exemplary gas turbine engine of FIG. 1 according to an exemplary embodiment of the present subject matter.

Referring now to the drawings, FIG. 1 is a schematic cross-sectional view of a gas turbine engine that provides a typical environment in which one expects to find exemplary embodiments of the present disclosure. More particularly, for the embodiment of FIG. 1, the gas turbine engine is a high-bypass turbofan jet engine 10, referred to herein as "turbofan engine 10." Such engines typically embody a cylindrical symmetry. As shown in FIG. 1, the turbofan engine 10 defines an axial direction A (extending parallel to a longitudinal centerline 12 provided for reference) and a radial direction R that is normal to the axial direction A. As schematically shown in FIG. 3 for example, the circumferential direction C revolves 360° around the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison concentrically with respect to the longitudinal centerline 12. A low pressure (LP) shaft or spool 36 drivingly connects the LP turbine 30 to the LP compressor 22 to rotate them in unison concentrically with respect to the longitudinal centerline 12. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable HP compressor 24 and HP turbine 28 configurations may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc., as well as turbine engines used for other vehicles or in stationary applications.

Figure 2:
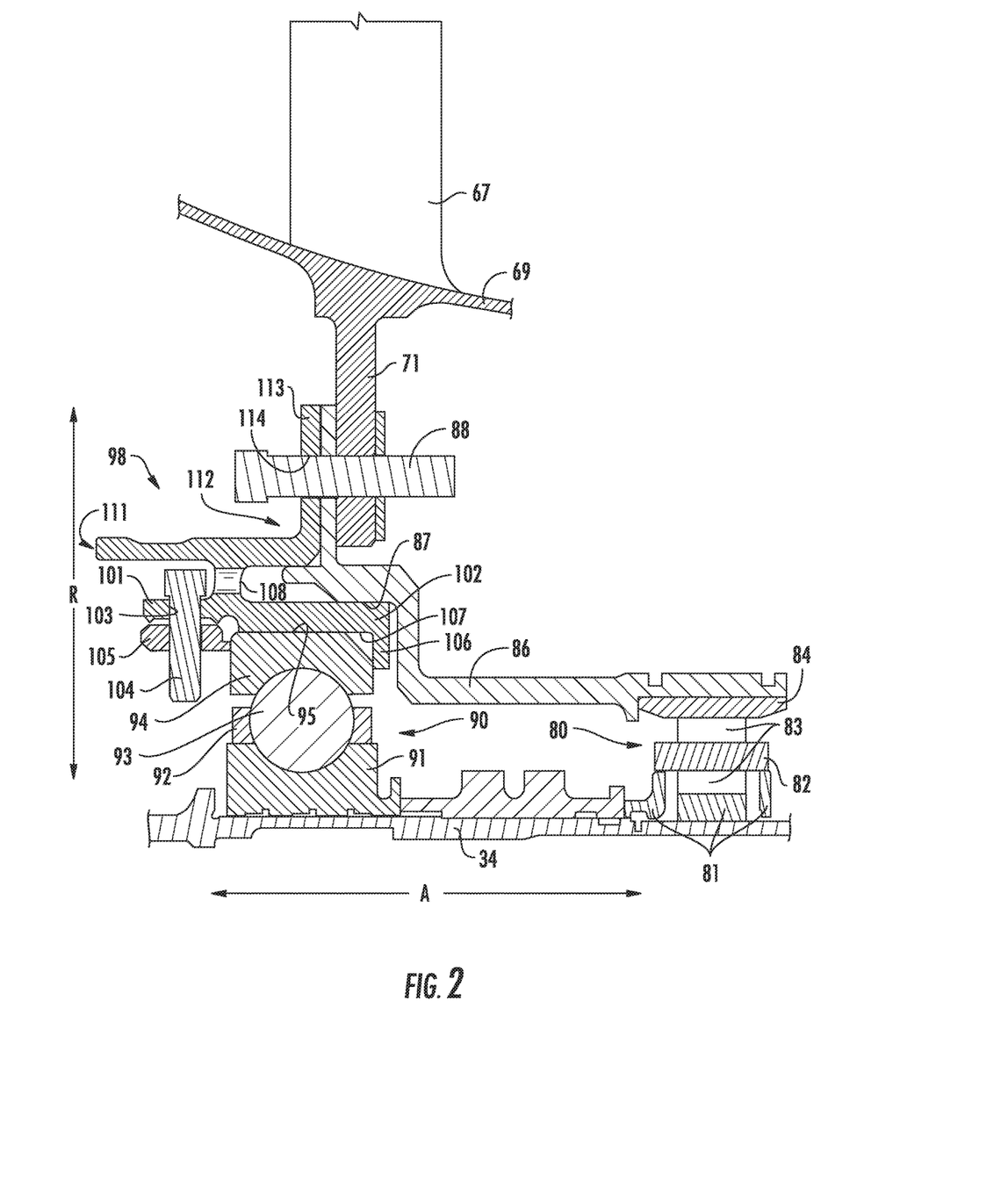
FIG. 2 is a cross-sectional view of components within the dashed outline of the box designated FIG. 2 in FIG. 1.

FIG. 2 presents a cross-sectional view of components within the dashed outline of the box designated FIG. 2 in FIG. 1. One end of a stator vane 67 of the HP compressor 24 is mounted to a stationary structural frame 69, while the opposite end of the stator vane 67 is truncated in the view shown in FIG. 2 but would be held fixed with respect to the outer casing 18. A flange 71 is connected to and depends radially inwardly from the stationary structural frame 69. The inner ring 81 of a roller bearing 80 is non-rotatably coupled to the HP spool 34. The roller bearing 80 includes a cage 82, a plurality of rollers 83 (only one roller 83 being depicted in the view shown in FIG. 2) and an outer ring 84. As schematically shown in FIG. 2, interface hardware 86 non-rotatably couples the outer ring 84 of the roller bearing 80 to the flange 71 of the stationary structural frame 69 via a mechanical fastener such as a bolt 88. The inner ring 91 of a ball bearing 90 is non-rotatably coupled to the HP spool 34. The ball bearing 90 also includes a cage 92, balls 93 (only one ball 93 being shown in the view of FIG. 2) and an outer ring 94 that is disposed radially outwardly farther away from the axis of rotation 12 than the disposition of the inner ring 91.

Figure 4:
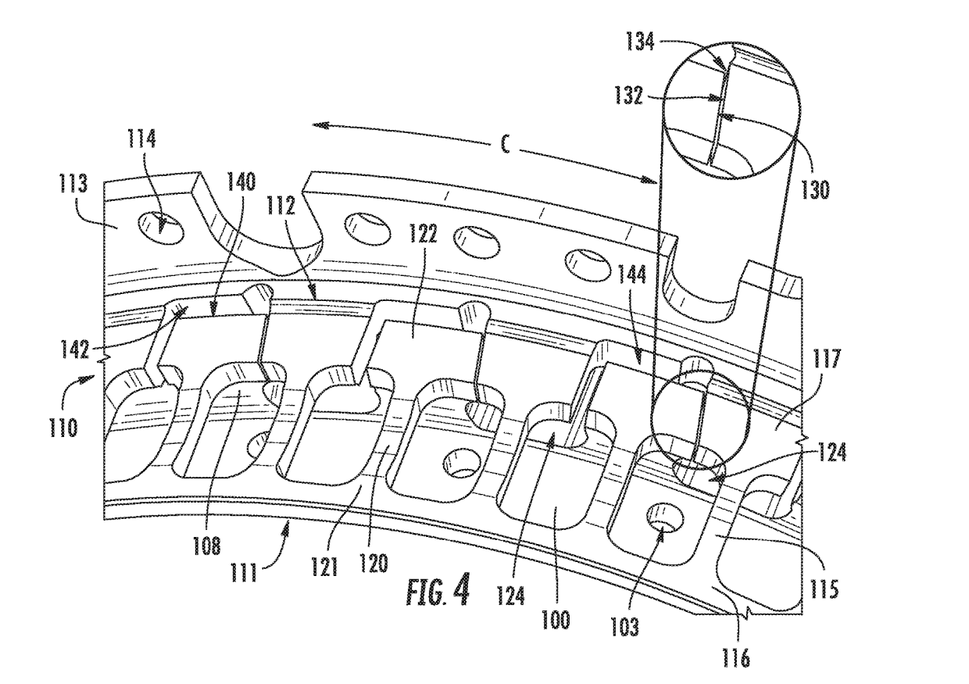
FIG. 4 is a perspective view of a section of the exemplary retention housing of FIG. 3 taken from the dashed outline of the box designated FIG. 4 in FIG. 3.

In accordance with an embodiment of the present invention, a retention housing 98 is generally designated by the numeral 98 in FIGS. 2 and 3 and configured and disposed for retaining the ball bearing 90 and absorbing the loads that result from a failure of a fan blade, a compressor blade or a turbine blade when any such blade suffers any compromise of its structural integrity, e.g., becomes at least partially detached or broken. As shown in FIG. 3 for example, the retention housing 98 desirably includes a ball bearing housing 100 and a spring finger housing 110 disposed radially outwardly from the ball bearing housing 100 and concentrically around the ball bearing housing 100 with respect to a central rotational axis 89 of the retention housing 98. As schematically shown in FIG. 3 for example, the ball bearing housing 100 defines its own forward end 101, which is disposed axially apart from its own aft end 102. Similarly, as schematically shown in FIGS. 3 and 4 for example, the spring finger housing 110 defines its own forward end 111, which is disposed axially apart from its own aft end 112.

As schematically shown in FIG. 2 for example, the retention housing 98 non-rotatably couples to the flange 71 of the stationary structural frame 69, the outer ring 94 of the ball bearing 90 for a high pressure spool 34 of a gas turbine engine 10. The spring finger housing 110 can be fixed with respect to the outer casing 18 as by being mechanically bolted or welded to the flange 71. In one exemplary embodiment, the spring finger housing 110 is rendered stationary by being coupled to the outer casing 18 in a manner that can be performed in any of a number of conventional manners, any one of which being suitable for purposes of illustrating exemplary embodiments of the present disclosure. As shown in FIG. 2 for example, this can be accomplished via an annular mounting flange 113 that elongates generally in a radial direction from the aft end 112 of the spring finger housing 110. The spring finger housing 110 and the annular mounting flange 113 desirably are formed as a monolithic structure.

As shown in FIG. 3, the annular mounting flange 113 is drilled with a plurality of axially extending mounting holes 114 therethrough. As shown in FIG. 2 for example, each of the mounting holes 114 through the annular mounting flange 113 of the retention housing 98 desirably is configured to receive a respective mounting bolt 88 (one of which being depicted in cross-section in the view of FIG. 2) by which the mounting flange 113 may be attached to the flange 71 of the stationary structural frame 69. As shown in FIG. 2 for example, the annular mounting flange 113 non-rotatably couples the spring finger housing 110 to the flange 71 of the stationary structural frame 69 via a mechanical fastener such as a bolt 88, which enables the retention housing 98 to be removed from the engine 10 for replacement, maintenance and/or repair.

As shown in FIG. 3 for example, the forward end 101 of the ball bearing housing 100 is provided with a plurality of openings 103. Each such opening 103 is configured to receive therein an attachment bolt 104 such as depicted in cross-section in FIG. 2 and which is locked by a retention nut 105. The ball bearing housing 100 includes a retention flange 106, which extends radially inwardly toward the central axis 89 from the aft end 102 of the ball bearing housing 100. As shown in FIG. 2 for example, the outer ring 94 of the ball bearing 90 is restrained against axial movement by being held between the retention flange 106 of the ball bearing housing 100 and the retention nut 105. Accordingly, under normal operating conditions of the engine 10, the outer ring 94 of the ball bearing 90 becomes restrained against axial movement with respect to the HP spool 34. As schematically shown in FIGS. 2 and 3, the ball bearing housing 100 defines a cylindrical inner surface 107 that is disposed equidistantly from the central axis of rotation 89 that extends in an axial direction. As shown in FIG. 2 for example, this inner surface 107 of the ball bearing housing 100 of the retention housing 98 desirably contacts the cylindrically shaped outer surface 95 of the outer ring 94 of the ball bearing 90.

As schematically shown in FIGS. 3 and 4 for example, the spring finger housing 110 defines a plurality of axially extending struts 115. As best shown in FIG. 4 for example, each strut 115 defines a forward end 116 and an aft end 117 disposed axially spaced apart from and opposite to the forward end 116 of each respective strut 115. Similarly, the spring finger housing 110 defines a plurality of axially extending fingers 120. Each finger 120 defines a forward end 121 and an aft end 122 disposed axially spaced apart from and opposite to the forward end 121 of each respective finger 120. Desirably, the plurality of struts 115 and the plurality of forward ends 121 of the fingers 120 form a monolithic structure with the spring finger housing 110.

As shown in FIG. 3 for example, the struts 115 and the fingers 120 are interdigitated around the spring finger housing 110 in a circumferential direction schematically indicated by the arrows designated by the letter C. In other words, single ones of the fingers 120 alternate with single ones of the struts 115 as one proceeds circumferentially around the spring finger housing 110.

Figure 6:
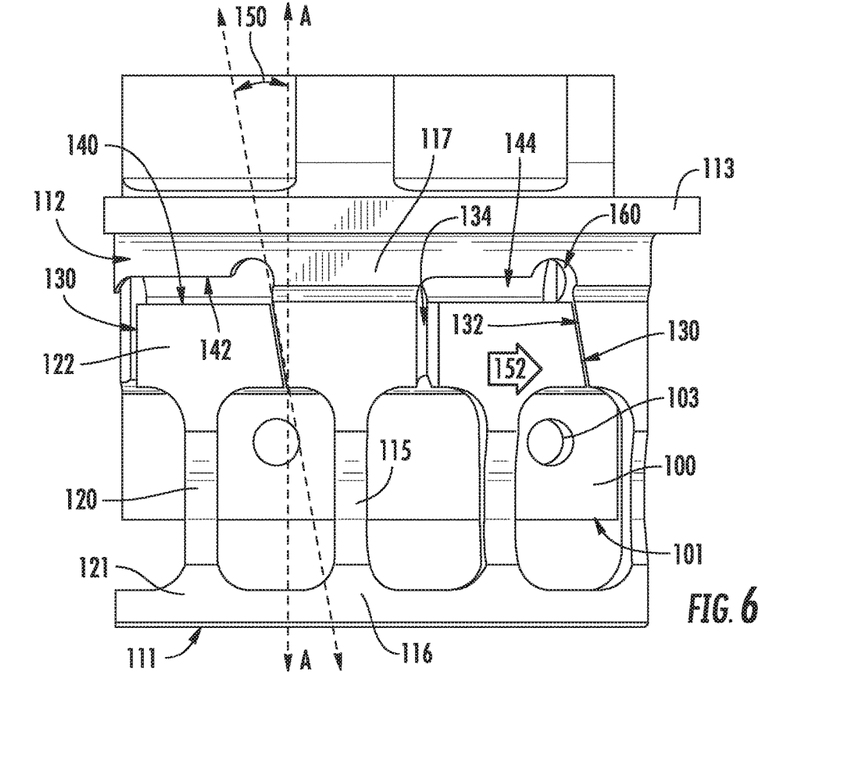
FIG. 6 is a top view of a section of the exemplary retention housing of FIG. 3 taken looking inward along the radial direction.

As schematically shown in FIGS. 4 and 6 for example, each of the struts 115 and fingers 120 includes an intermediate portion that extends axially between each respective front end 116, 121 and respective aft end 117, 122 of each respective strut 115 and finger 120. Each of these intermediate portions is narrower than each respective front end 116, 121 and respective aft end 117, 122 of each respective strut 115 and finger 120. Each respective strut 115 and finger 120 undergoes a tapering from each opposite end of each respective strut 115 and finger 120 to a certain degree until the narrowed dimension of that respective strut 115 or finger 120 is attained. Each opposite circumferential side and top and bottom surface of each strut 115 and finger 120 can be machined to attain the desired tapering. The specific relative dimensions of the intermediate portions with respect to the front ends 116, 121 and aft ends 117, 122 will depend upon the dimensions and composition of the retention housing 98 as well as the anticipated level of stress for which the retention housing 98 is being engineered.

In a typical case, the stress that is to be absorbed by the fingers 120 will be greater than the stress that is anticipated to be borne by the struts 115, and in such a typical case the fingers 120 will be tapered to a lesser degree than the struts 115, and thus the fingers 120 overall will be thicker than the struts 115. However, it is anticipated that there may be some applications in which the opposite would be desired so that struts 115 would be thicker than the fingers 120, even though in both cases there would be some tapering of the fingers 120 and struts 115. Because of this tapering of the fingers 120 and struts 115, the axial lengths of the respective struts 115 and fingers 120 can be shortened relative to the lengths of conventional fingers and struts. Additionally, the tapering of the fingers 120 and struts 115 results in a reduction in the overall weight of the retention housing 98 when compared to a conventional retention housing.

Figure 7:
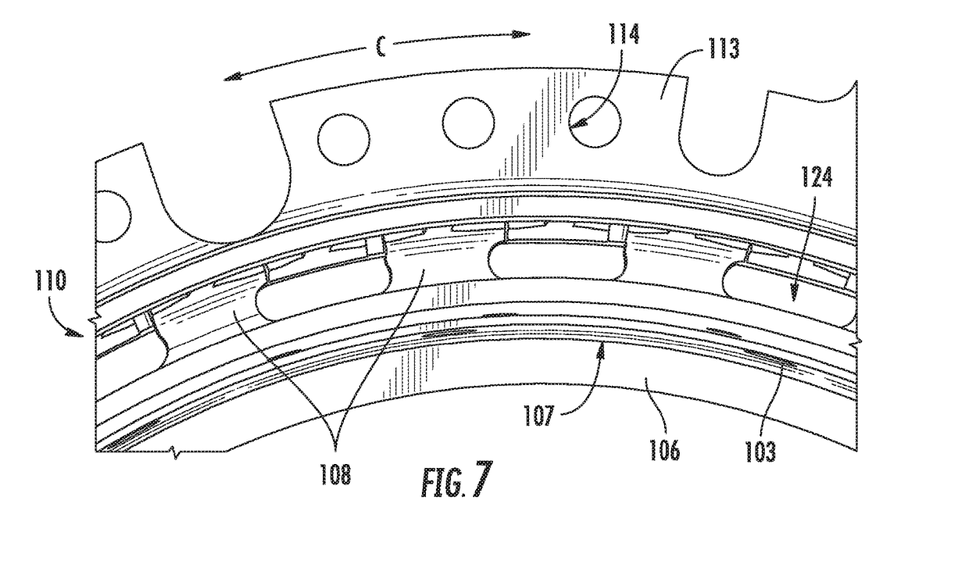
FIG. 7 is a front view of a section of the exemplary retention housing of FIG. 3 taken along an axial direction.

Referring to FIG. 7 for example, each embodiment of the retention housing 98 desirably includes a plurality of bridge webs 108. Each bridge web 108 extends in the radial direction (R) between the ball bearing housing 100 and the spring finger housing 110 and connects the ball bearing housing 100 to the spring finger housing 110. As illustrated in FIGS. 4-7 for example, each bridge web 108 desirably is connected to the spring finger housing 110 closer to the axial midpoint of the spring finger housing 110 than to either the forward end 111 or the aft end 112 of the spring finger housing 110.

As illustrated, a separate bridge web 108 connects the ball bearing housing 100 to a respective one of the plurality of fingers 120 of the spring finger housing 110. However, none of the struts 115 of the spring finger housing 110 is connected to the ball bearing housing 100 by a radially extending bridge web 108. In the embodiment depicted in FIGS. 4 and 5 for example, circumferentially extending oblong-shaped undercuts 124 are disposed beneath the respective struts 115 to separate the struts 115 of the spring finger housing 110 from the ball bearing housing 100. It should be appreciated that according to alternative embodiments, undercuts 124 may be any size, shape, and position suitable for providing separation between ball bearing housing 100 and spring finger housing 110.

Figure 5:
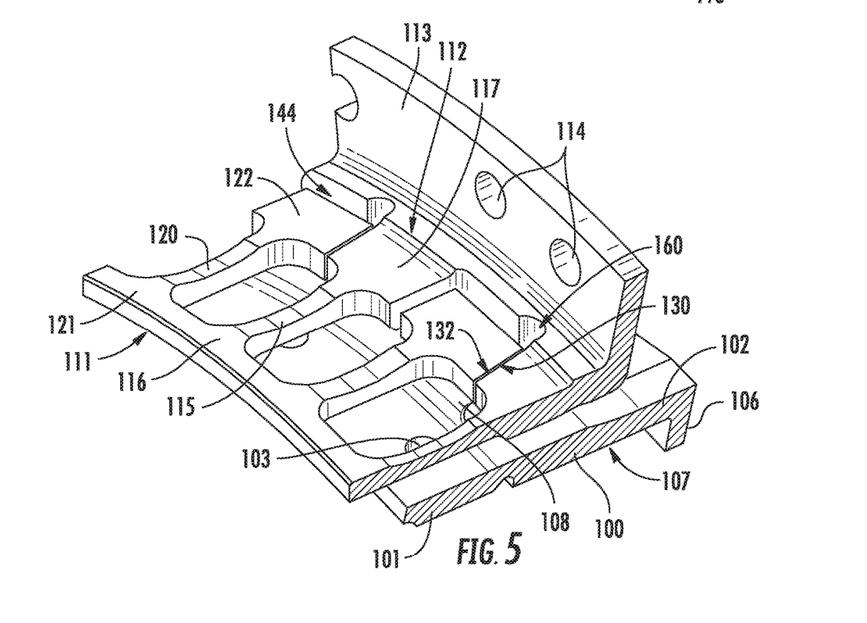
FIG. 5 is a perspective cross-sectional view of a section of the exemplary retention housing of FIG. 3 taken from a view similar to the view shown in FIG. 4.

As shown in FIGS. 4 through 6 for example, the aft end 122 of each of the plurality of fingers 120 defines a pair of side edges 130 that are spaced apart circumferentially from each other. Each side edge 130 of the aft end 122 of each finger 120 is spaced apart from an opposing side edge 132 of the adjacent strut 115 in the proximity of the aft end 112 of the spring finger housing 110 and defines a circumferential gap 134 between the respective side edges 130, 132 in the vicinity of the aft end 112 of the spring finger housing 110.

Notably, as illustrated in FIGS. 4 through 10, spring finger housing 110 can be configured for compensating for an anticipated unidirectional torque of the retention housing 98 in either a clockwise direction or a counterclockwise direction. Thus, between one of the side edges 130 of the aft end 122 of each finger 120 and the opposing side edge 132 of the adjacent strut 115, circumferential gap 134 will be relatively larger than on the other side of finger 120. This relatively large circumferential gap 134 results in a concomitant reduction in the weight of the retention housing 98. However, the opposite side edge 130 will define with its opposing side edge 132 of the other adjacent strut 115 a relatively smaller circumferential gap 134. This relatively smaller circumferential gap 134 may be on the order of the 5 thousandths of an inch to 20 thousandths of an inch. In this manner, the relatively small circumferential gap 134 will enable the finger 120 to act as a unidirectional bumper when the retention housing 98 is torqued in a direction that closes the relatively smaller circumferential gap 134.

In addition, the aft end 122 of each of the plurality of fingers 120 defines an aft edge 140 that is spaced apart from the aft end 112 of the spring finger housing 110. In this regard, for example, aft edge 140 extends substantially along the circumferential direction C between respective side edges 130 of each finger 120. In addition, aft end 112 of spring finger housing 110 defines an opposing edge 142 positioned opposite of aft edge 140 along the axial direction A to define an axial gap 144. Axial gap 144 generally extends along the circumferential direction C along a width of the aft end 122 of each finger 120. Thus, axial gap 144 is defined between aft edge 140 of each respective finger 120 and the opposing edge 142 of aft end 112 of spring finger housing 110. According to one exemplary embodiment, axial gap 144 is contiguous with circumferential gap 134 and has a height along the axial direction A that is approximately the same size as a width of the relatively large circumferential gap 134 as measured along the circumferential direction C. It should be appreciated, that as used herein, terms of approximation, such as "approximately," "substantially," or "about," refer to being within a ten percent margin of error.

According to exemplary embodiments of the present subject matter, side edges 130, opposing side edges 132, and the circumferential gaps 134 defined by these side edges 130, 132 may be oriented, angled, and shaped in any manner suitable for absorbing axial, radial, or torsional loads experienced by retention housing 98. For example, referring now to FIG. 6, at least one of the pair of side edges 130 of each of the plurality of fingers 120 extends at a first angle 150 relative to the axial direction A. In addition, opposing side edge 132 of the respective adjacent strut 115 may also extend at the first angle 150 relative to the axial direction A. As a result, circumferential gap 134 is also defined such that it extends substantially along the first angle 150 relative to the axial direction A.

Notably, by orienting side edges 130 at an angle with respect to the axial direction A or the central rotational axis 89, torsional loads on retention housing 98 are distributed among a larger number of fingers 120 than if the side edges 130 were parallel to the axial direction. For example, if a blade loss event results in a torsional load on retention housing 98, often only a few of the circumferential gaps 134 will close because the original gap size may vary from one circumferential gap 134 to the next, e.g., due to manufacturing variation. If only one or a few of these circumferential gaps 134 close, the corresponding fingers 120 experience very high stresses that may resulting in premature wear and/or failure.

By contrast, orienting side edges 130 at an angle (e.g., first angle 150) relative to the axial direction A can distribute a torsional load to more fingers 120 due to edges 130 and 132 sliding relative to each other and axial deflection of finger 120. More specifically, the axial deflection that occurs when edges 130 and 132 slip relative to each other also allows further circumferential displacement of spring finger housing 110 relative to ball bearing housing 100. Therefore, additional circumferential gaps 134 are closed and more fingers 120 share the torsional load.

The angle of the edges 130, 132 can be optimized to best meet specific load and space constraints. In this regard, for example, first angle 150 should be a non-zero angle greater than a friction lock angle which may be a function of the dimensions, finish, material, etc. of spring finger housing 110. According to one exemplary embodiment, first angle 150 is greater than about five degrees. According to another exemplary embodiment, first angle 150 is about ten degrees.

Moreover, as illustrated in FIGS. 4 through 6, first angle 150 is defined in a counterclockwise direction relative to the axial direction A when looking inward along the radial direction R onto spring finger housing 110. In this manner, as a torsional load is applied (indicated by arrow 152 in FIG. 6), side edge 130 of finger 120 engages opposing side edge 132 of strut 115 such that finger 120 is compressed slightly under when retention housing 98 is under torsional loading. This may be beneficial, for example, for absorbing large aft thrust loads.

Figure 8:
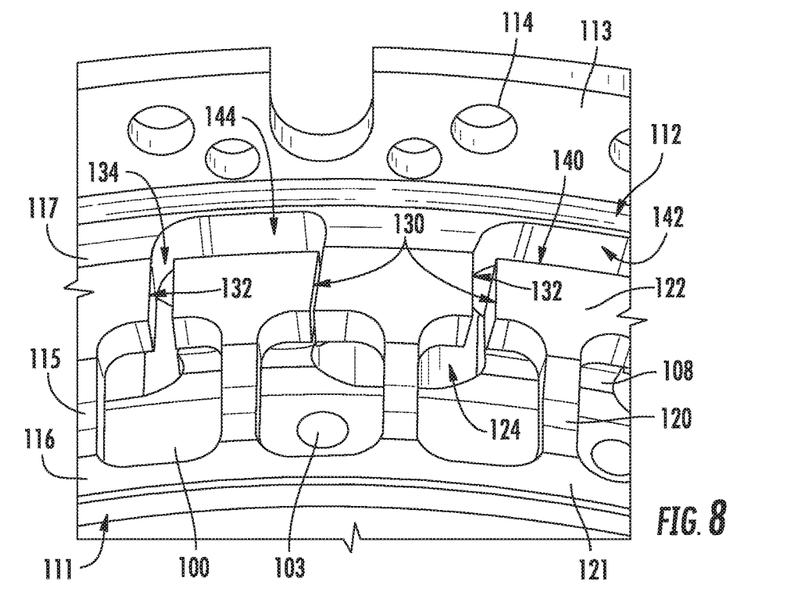
FIG. 8 is a perspective view of a section of a retention housing according to an alternative embodiment of the present subject matter.
Figure 9:
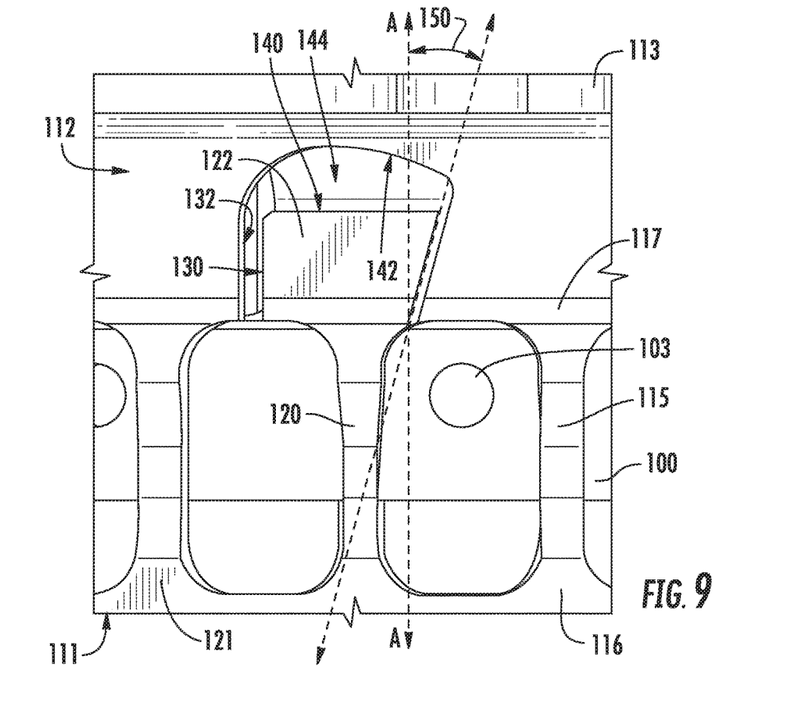
FIG. 9 is a top view of a section of an exemplary retention housing component having an alternative axial gap configuration according to an exemplary embodiment of the present subject matter.

By contrast, as illustrated in FIGS. 8 and 9, first angle 150 is defined in a clockwise direction relative to the axial direction A when looking inward along the radial direction R onto spring finger housing 110. In this manner, as a torsional load is applied (indicated by arrow 152 in FIG. 6), side edge 130 of finger 120 engages opposing side edge 132 of strut 115 such that finger 120 is in tension and stretches slightly under when retention housing 98 is under torsional loading. This may be beneficial, for example, for absorbing large forward thrust loads.

Figure 10:
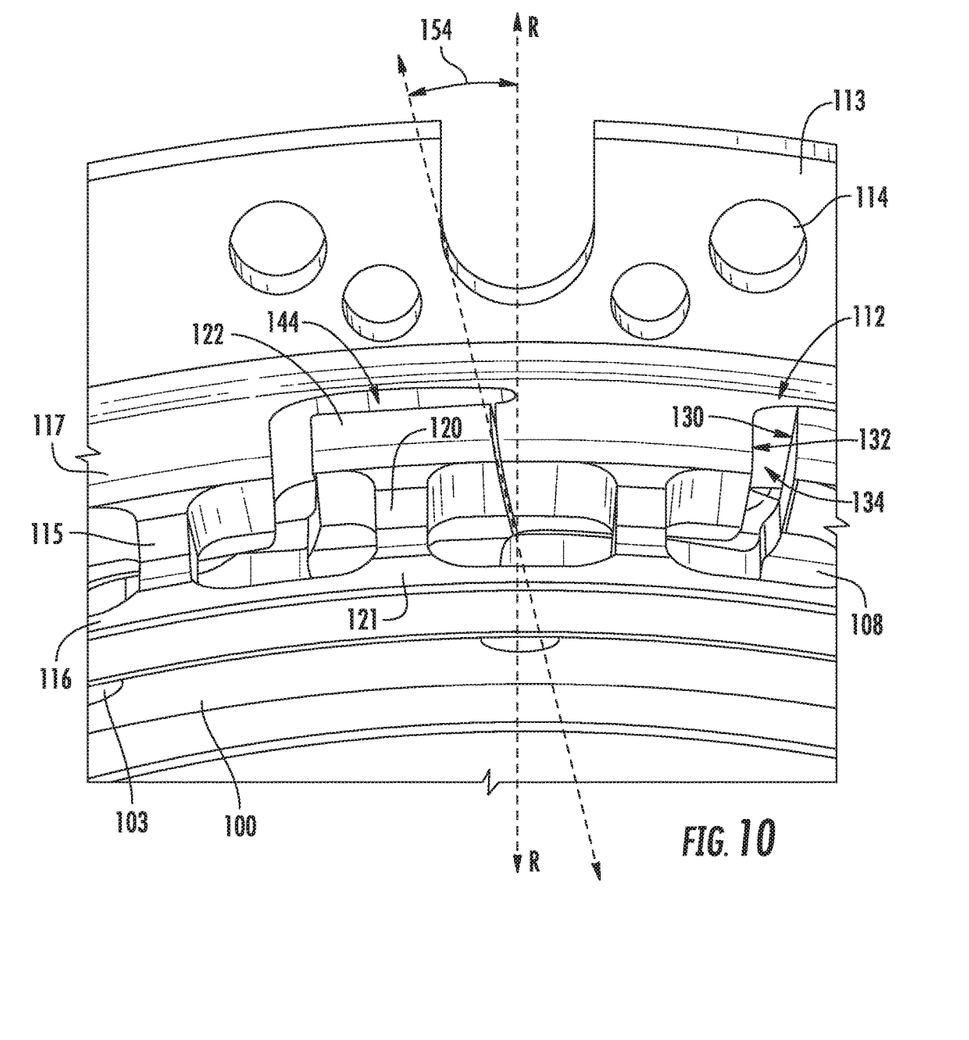
FIG. 10 is a perspective view of a section of a retention housing component having a spring finger with a side edge extending at an angle relative to the radial direction according to an exemplary embodiment of the present subject matter.

Referring now to FIG. 10, according to an exemplary embodiment of the present subject matter, side edges 130, 132 may be angled relative to the axial direction A, the radial direction R, or both. As illustrated, at least one of the pair of side edges 130 of each of the plurality of fingers 120 extends at a second angle 154 relative to the radial direction R. In addition, opposing side edge 132 of the respective adjacent strut 115 may also extend at the second angle 154 relative to the radial direction R. It should be appreciated, the side edges 130 may be contoured in any suitable manner along any suitable plane to achieve the desired interaction between side edges 130 of finger 120 and opposing side edges 132. Similar to first angle 150 as described above, second angle 154 can be optimized to best meet specific load and space constraints. In this regard, for example, second angle 154 should be a non-zero angle greater than a friction lock angle, e.g., greater than about five degrees, or about ten degrees.

Referring now specifically to FIG. 6, opposing edge 142 of spring finger housing 110 extends substantially parallel to aft edge 140 of each of the plurality of fingers 120, e.g., substantially along the circumferential direction C. In addition, opposing edge 142 may define any profile suitable for providing axial gap 144 while reducing component weight, eliminating stress concentrations, etc. For example, referring still to FIG. 6, opposing edge 142 may further define an arcuate recess 160 for reducing stress concentrations in aft end 112 of spring finger housing 110. More specifically, when torsional loads cause spring fingers 120 to press against aft ends 117 of struts 115, stress concentrations generated at the junction where struts 115 meet aft end 112 of spring finger housing 110 may result in premature wear, cracking, and/or failure of spring finger housing 110. Arcuate recess 160 may be positioned and designed for better distributing those stresses to extend the lifetime to the component.

According to the illustrated embodiment, arcuate recess 160 is formed at the junction where struts 115 meet aft end 112 of spring finger housing 110 and is configured for reducing stress concentrations in this area. In this regard, referring to FIG. 6 for example, opposing side edge 132 of strut 115 extends along first angle 150 such that opposing side edge 132 intersects a portion of arcuate recess 160. According to another embodiment, arcuate recess 160 may be positioned immediately aft of one of the side edges 130 of the plurality of fingers 120 along the axial direction A.

It should be appreciated that according to alternative embodiments, opposing edge 142 of spring finger housing 110 may have any size or shape suitable for providing the desired axial gap 144 and suitably absorbing axial, radial, or torsional loads applied to retention housing 98. For example, as illustrated in FIGS. 8 through 10, opposing edge 142 is a single arc that extends over the entire width of finger 120, e.g., as defined along a circumferential direction C between opposite side edges 130. Other shapes and configurations are possible and within the scope of the present subject matter.

As shown in FIG. 9 for example, the axial gap 144 and the circumferential gaps 134 combine to free the aft end 122 of each respective finger 120 from the aft end 112 of the spring finger housing 110 and the adjacent struts 115 to allow movement of the aft end 122 of each spring finger 120 in the radial direction R and in the circumferential direction C in a pivoting action anchored at the forward end 121 of each spring finger 120 and independent of the adjacent struts 115 and the aft end 112 of the spring finger housing 110.

Desirably, the spring finger housing 110, the bridge webs 108 and the ball bearing housing 100 are formed as a monolithic structure. With this configuration of separation between the struts 115 and the ball bearing housing 100, movements of the HP spool 34 in the radial direction (R) during a liberated blade event are damped by the fingers 120 having their forward ends 121 anchored to the forward end 111 of the spring finger housing 110 and having their aft ends 122 free to move in the radial direction (along with the radial movement of the ball bearing housing 100) with respect to the forward ends 121 of the spring finger housing 110.

During normal engine operation, the ball bearing assembly 90 acts to retain the axial position of the HP spool 34, and the associated roller bearing assembly 80 acts to provide radial damping of the fan/rotor system. In the embodiment shown in FIGS. 4-6 for example, a radial bumper gap is defined between the aft end 102 of the ball bearing housing 100 and the overlying inner surface 87 of the interface hardware 86 that is connected to the outer ring 84 of the roller bearing 80 as schematically shown in FIG. 2 for example. The size of this radial bumper gap is controlled to absorb the anticipated relatively small radial deviations of the HP spool 34 and typically would have dimensions within a range on the order of 5 thousandths of an inch to 20 thousandths of an inch. However, it should be appreciated that according to alternative embodiments, there is no need for interface hardware 86.

However, during a failure mode that results from either a liberated fan blade, a liberated compressor blade or a liberated turbine blade, very high radial loads close the damper gap in the embodiment depicted in FIGS. 5 and 6. In both embodiments, the very high radial loads create a harmonic drive effect that loads the spring fingers 120 in torsion. This torsion load on the ball bearing 90 and its retention housing 98 results in an opposing sinusoidal load distribution that tends to twist the spring fingers 120. However, this twisting becomes damped when the side edges 130 of the fingers 120 move a sufficient distance in the circumferential direction to close the respective circumferential gaps 134 on one of the opposite sides of each respective finger 120 and come into contact with the respective opposing side edges 132 of the respective adjacent struts 115. The size of this circumferential gap 134 on the opposite sides of each finger 120 widen commensurately by moving the same distance away from the respective opposing side edges 132 of the respective adjacent struts 115. When not under these sorts of torsion loads, each circumferential gap 134 is controlled to absorb the anticipated relatively small circumferentially directed movements that are anticipated to twist the spring finger housing 110 and thus each relatively smaller circumferential gap 134 typically would have dimensions within a range on the order of 5 thousandths of an inch to 20 thousandths of an inch.

According to exemplary embodiments, the application of an axial thrust load is absorbed by the retention housing 98 by virtue of the aftward movements of the fingers 120 that is permitted by the axial gap 144 that exists between the aft edge 140 of each finger 120 and the aft end 112 of the spring finger housing 110.

The retention housing 98 with its spring finger housing 110 described herein has several advantages over the prior art. By employing circumferential gaps 134, radial undercuts 124, and axial gaps 144 between the individual fingers 120 of the spring finger housing 110 and the retention housing 98 for the ball bearing 90, each of the circumferential gaps 134, radial undercuts 124, and axial gaps 144 can be controlled according to the anticipated load in consideration of the size and material composition of the structure of the retention housing 98. For example, each spring finger 120 may define side edges 130 that are angled relative to the axial direction A. In this manner, spring fingers 120 may slide or deflect along the axial direction A when side edges 130 engage a corresponding side edge 132 of the aft end of the spring finger housing 112, thus allowing more spring fingers 120 to engage the spring finger housing 110 and more evenly distribute axial and torsional loads. The resulting design of the spring finger housing 110 integrates the structural components such that they become capable of withstanding the torsional windup and high radial loads that occur with the sudden increase in load that accompanies a blade failure, whether a fan blade, a compressor blade or a turbine blade. Moreover, due to the unique tapered and relatively short design of the spring fingers 120 and struts 115, the amount of axial and radial space needed for the spring finger housing 110 is reduced along with a concomitant reduction in the weight of the retention housing 98 while affording a very high torsional load capability to the retention housing 98.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A retention housing defining an axial direction and a radial direction perpendicular to the axial direction, the retention housing comprising:
    a ball bearing housing;
    a spring finger housing defining a plurality of axially extending struts, each strut defining a forward end and an axially opposite aft end, and a plurality of axially extending fingers, each finger defining a forward end and an axially opposite aft end;
    a bridge web extending between and connecting the ball bearing housing to the spring finger housing;
    wherein the aft end of each of the plurality of fingers defines a pair of side edges that are circumferentially spaced apart from each other, wherein each side edge of the aft end of each finger is spaced apart from an opposing side edge of a respective adjacent strut at the aft end of the spring finger housing to define a circumferential gap; and
    wherein at least one of the pair of side edges of each of the plurality of fingers extends at a non-zero first angle relative to the axial direction and the opposing side edge of the respective adjacent strut extends at the first angle relative to the axial direction.

2. The retention housing of claim 1, wherein the first angle is greater than about five degrees.

3. The retention housing of claim 1, wherein the first angle is about ten degrees.

4. The retention housing of claim 1, wherein the first angle is defined in a clockwise direction relative to the axial direction when looking inward along the radial direction onto the spring finger housing.

5. The retention housing of claim 1, wherein the first angle is defined in a counterclockwise direction relative to the axial direction when looking inward along the radial direction onto the spring finger housing.

6. The retention housing of claim 1, wherein at least one of the pair of side edges of each of the plurality of fingers extends at a non-zero second angle relative to the radial direction and the opposing side edge of the respective adjacent strut extends at the second angle relative to the radial direction.

7. The retention housing of claim 6, wherein the second angle is greater than about five degrees.

8. The retention housing of claim 1, wherein the aft end of each of the plurality of fingers defines an aft edge that is spaced apart from an opposing edge of the aft end of the spring finger housing and defines an axial gap between the aft edge of the respective finger and the opposing edge of the aft end of the spring finger housing.

9. The retention housing of claim 8, wherein the opposing edge extends substantially parallel to the aft edge of each of the plurality of fingers.

10. The retention housing of claim 9, wherein an arcuate recess is defined by the opposing edge of the aft end of the spring finger housing.

11. The retention housing of claim 10, wherein the opposing side edge of the respective adjacent strut extends along the first angle to intersect a portion of the opposing edge of the aft end of the spring finger housing that defines the arcuate recess.

12. A gas turbine engine, comprising:
    a fan including a plurality of blades extending radially from a hub and rotatable about a first axis of rotation defined centrally through the hub;
    a compressor disposed downstream from the fan;
    a turbine disposed downstream of the compressor;
    a rotatable input shaft mechanically coupling the compressor to rotate in unison with the turbine;
    and an engine envelope surrounding the fan, the compressor, and the turbine;
    a ball bearing having an inner race rotatable with respect to an outer race, wherein the inner race is non-rotatably coupled to the input shaft; and
    a retention housing that non-rotatably couples the engine envelope to the outer race of the ball bearing; and
    wherein the retention housing further includes:
    a ball bearing housing defining a cylindrical inner surface that is disposed equidistantly from an axis of rotation that extends in an axial direction, a radial direction being defined in a direction that is normal to the axial direction,
    a spring finger housing disposed radially outwardly from the ball bearing housing and concentrically around the ball bearing housing and defining a forward end disposed axially apart from an aft end,
    a bridge web extending in the radial direction between the ball bearing housing and the spring finger housing and connecting the ball bearing housing to the spring finger housing,
    the spring finger housing defining a plurality of axially extending struts, each strut defining a forward end and an aft end disposed axially spaced apart from and opposite to the forward end of each respective strut, the plurality of struts forming a monolithic structure with the spring finger housing,
    the spring finger housing defining a plurality of axially extending fingers, each finger defining a forward end and an aft end disposed axially spaced apart from and opposite to the forward end of each respective strut, the plurality of forward ends of the fingers forming a monolithic structure with the spring finger housing, and
    wherein the aft end of each of the plurality of fingers defines an aft edge that is spaced apart from an opposing edge of the aft end of the spring finger housing and defines an axial gap between the aft edge of the respective finger and opposing edge of the aft end of the spring finger housing,
    wherein the aft end of each of the plurality of fingers defines a pair of side edges that are circumferentially spaced apart from each other, wherein each side edge of the aft end of each finger is spaced apart from the aft end of the spring finger housing and defines a circumferential gap between the respective side edge and the aft end of the spring finger housing, and wherein at least one of the pair of side edges of each of the plurality of fingers extends at a non-zero first angle relative to the axial direction.

13. The gas turbine engine of claim 12, wherein the first angle is greater than about five degrees.

14. The gas turbine engine of claim 12, wherein the first angle is defined in a clockwise direction relative to the axial direction when looking inward along the radial direction onto the spring finger housing.

15. The gas turbine engine of claim 12, wherein the first angle is defined in a counterclockwise direction relative to the axial direction when looking inward along the radial direction onto the spring finger housing.

16. The gas turbine engine of claim 12, wherein at least one of the pair of side edges of each of the plurality of fingers extends at a non-zero second angle relative to the radial direction.

17. The gas turbine engine of claim 12, wherein the opposing edge extends substantially parallel to the aft edge of each of the plurality of fingers.

18. The gas turbine engine of claim 17, wherein an arcuate recess is defined by the opposing edge of the aft end of the spring finger housing.

19. The gas turbine engine of claim 18, wherein the arcuate recess is positioned immediately aft of one of the side edges of the plurality of fingers along the axial direction.

20. A retention housing for the outer race of a ball bearing for a high pressure spool of a gas turbine engine, the retention housing comprising:
- a ball bearing housing defining a cylindrical inner surface that is disposed equidistantly from an axis of rotation that extends in an axial direction, a radial direction being defined in a direction that is normal to the axial direction;
- a spring finger housing disposed radially outwardly from the ball bearing housing and concentrically around the ball bearing housing and defining a forward end disposed axially apart from an aft end;
- a bridge web extending in the radial direction between the ball bearing housing and the spring finger housing and connecting the ball bearing housing to the spring finger housing;
- the spring finger housing defining a plurality of axially extending struts, each strut defining a forward end and an aft end disposed axially spaced apart from and opposite to the forward end of each respective strut, the plurality of struts forming a monolithic structure with the spring finger housing;
- the spring finger housing defining a plurality of axially extending fingers, each finger defining a forward end and an aft end disposed axially spaced apart from and opposite to the forward end of each respective strut, the plurality of forward ends of the fingers forming a monolithic structure with the spring finger housing;
- wherein the aft end of each of the plurality of fingers defines an aft edge that is spaced apart from an opposing edge of the aft end of the spring finger housing and defines an axial gap between the aft edge of the respective finger and the opposing edge of the aft end of the spring finger housing;
- wherein the aft end of each of the plurality of fingers defines a pair of side edges that are circumferentially spaced apart from each other, wherein each side edge of the aft end of each finger is spaced apart from an opposing side edge of a respective adjacent strut at the aft end of the spring finger housing and defines a circumferential gap between the respective side edge of the respective finger and the respective opposing side edge of the respective strut at the aft end of the spring finger housing; and
- wherein at least one of the pair of side edges of each of the plurality of fingers extends at a non-zero first angle relative to the axial direction and the opposing side edge of the respective adjacent strut extends at the first angle relative to the axial direction.

* * * * *